United States Patent Office 2,824,108
Patented Feb. 18, 1958

2,824,108

METHOD FOR MAKING METAL PHTHALOCYANINE PIGMENTS

Henry J. Kehe and Edwin B. Newton, Akron, Ohio, assignors to The B. F. Goodrich Company, New York, N. Y., a corporation of New York No Drawing. Application September 28, 1954
Serial No. 458,970

10 Claims. (Cl. 260—314.5)

This invention relates to a method for producing phthalocyanine pigments. More specifically, the present invention relates to a novel method for catalyzing phthalocyanine forming materials to produce metal phthalocyanine coloring compounds or compositions.

"Catalysts" having long been used in the process of producing phthalocyanine pigments. Some of these materials are not strictly catalysts since they are altered during the reaction. However, they do not usually enter the phthalocyanine molecule and generally comprise a metal compound in which the metal is usually different from that to be obtained in the phthalocyanine pigment itself. Of the catalysts proposed in the past, the inorganic compounds and, particularly, the metal oxides have been used. However, it has been observed that the actual yields obtained using metal oxides are unfortunately considerably less than the expected or theoretical yield. Hence, it is a primary object of the present invention to provide a method of utilizing a metallic oxide catalyst in the phthalocyanine reaction to provide yields that are substantially theoretical.

It is another object of the present invention to provide a method for producing phthalocyanine pigments using as a catalyst a specially prepared metallic oxide selected from the group consisting of titanium dioxide and zirconium dioxide and characterized by providing high yields of metal phthalocyanine pigments.

These and other objects and advantages of the present invention will become more apparent to those skilled in the art from the following detailed description and examples.

It has now been discovered according to the present invention that high yields of metal phthalocyanine pigments can be obtained by employing in the phthalocyanine reaction to produce metal phthalocyanine pigments a freshly prepared essentially anion-free hydrated metallic oxide gel as a catalyst. In particular, the anion-free hydrated titanium dioxide and zirconium dioxide gels are preferred due to their ready availability and ease of preparation.

The catalyst used in the practice of the present invention can be any of the hydrated metallic oxide gels of antimony, arsenic, molybdenum, tin, titanium, tungsten, zirconium and mixtures thereof and the like. Preferably the hydrated titanium and zirconium dioxide gels are used because of their ease of preparation and the high yields obtained. The gels are preferably prepared by hydrolyzing the halide or other hydrolyzable metallic salt and then washing the gel to free it of the anions, such as chloride ions if a chloride of the metal was the starting material for gel formation. Another way to prepare the gel is to dissolve the metallic oxide in strong acid, dilute with water and neutralize. For example, titanium dioxide can be dissolved in strong (50%) sulfuric acid, diluted with a large volume of water and neutralized with ammonium hydroxide to precipitate the gel followed by washing. It is necessary to remove all or essentially all of the anions from the gel in order to provide the highest conversions of the phthalocyanine materials. Moreover, the gel should be freshly prepared when used in the reaction because observation showed that aging the gel for an extended period seriously reduced its catalytic activity.

The catalyst is used in the reaction in a minor amount. However, for best results, there should be used at least about 1 mol of catalyst, computed as metallic ions, for every 4 mols of the phthalocyanine forming material or every mol of the product obtained. Preferably, an excess over this amount is used. If an insufficient amount of catalyst is used, the reaction procedes at a slower rate to produce smaller yields of product and larger particles of pigment as well as dirty colors which, of course, are to be avoided. Very large amounts of catalyst are unnecessary as no appreciable increase in conversion is realized. None of the catalyst is recoverable, however, at the end of the reaction in the hydrated gel condition. While it may be obtained as the oxide, this material has little or no catalytic activity.

The phthalocyanine forming material includes orthophthalic acid and its derivatives and mixtures thereof useful in producing phthalocyanine coloring matters or pigments. This term, thus, includes phthalic acid, phthalic anhydride, phthalic acid monoamide, phthaldiamide, phthalimide, phthalimimide, monoammonium phthalate, monoammonium o-carbamyl-benzoate, monoammonium o-cyano-benzoate, o-cyano-benzoic acid, o-cyano-benzamide, and the like. There are also included in this term the halogenated derivatives of the applicable compounds such as the mono-, di-, tri- and tetrabromo or chloro phthalic acids, their derivatives, as well as the halogenated mono and diammonium salts, the anhydrides, imides, mono and diamides, imimides, the orthocyanobenzamides, the lower monoalkyl esters such as the methyl and ethyl esters and other halogenated derivatives of phthalic acid, and mixtures thereof. In place of halogen derivatives, the alkoxy derivatives of such compounds may be employed. The phthalocyanine forming material thus includes substituted and unsubstituted orthophthalic acid and its derivatives and mixtures thereof which are useful in forming phthalocyanine pigments varying generally from blue to green in color.

The phthalocyanine forming metal donor reagent which supplies metal ions under the conditions of the reaction can be any metal heretofore used for producing metal phthalocyanine pigments. In general, the polyvalent metals are used such as copper, nickel, iron, cobalt, vanadium, tin, chromium, lead and the like, although other metals such as aluminum, cadmium, magnesium and zinc may also be employed successfully as metal donors. The free metal or its salt may be employed. The amount of metal donor employed is sufficient to obtain the desired amount of metal in the resulting pigment and usually will amount in moles to about a fourth of the amount of the phthalocyanine forming material used. Preferably a slight excess of the donor metal is provided in the reaction to insure that sufficient metal ions are present to enter the phthalocyanine molecule. Moreover, oxidizing agents such as permanganates may also be employed to oxidize the metals. Of the various metals employed it is preferable to employ copper as a donor in the form of copper chloride or copper nitrate to obtain the most useful pigment and highest yields.

Solvents suitable for the reaction producing phthalocyanine pigments are inert organic solvents having a sufficiently high boiling point, up to about 250° C., to remain liquid under the conditions of the reaction. Examples of such solvents are trichlorobenzene, chlorobenzene, dichlorobenzene, naphthalene and its chlorinated derivatives, quinoline, benzophenone, nitrobenzene, etc. Sufficient solvent is employed to dissolve or disperse the reactants and to maintain a liquid mass of some fluidity.

The nitrogen supplying material or donor used in the reaction may be urea, biuret, guanidine, guanylurea, dicyandiamide or cyanuric acid and the like. While the amount of the nitrogen donor can vary within a wide range, it is preferred to employ an excess over the theoretical amount necessary to form the phthalocyanine pigment since some of the nitrogen donor may decompose or react to produce ammonia which may escape from the system or be unavailable for producing the pigment and also because the excess amount of the nitrogen donor acts as a flux for the reactants and affords to the reaction mass a suitable consistency for manipulation and maintenance of homogeneity. Thus, the ratio in mols of the amount of the nitrogen donor to the phthalocyanine forming material may vary from about 1:1 to 5:1 or more. More preferably, from about 3 to 7 mols of the nitrogen donor per mol of the phthalocyanine forming material are used to provide optimum reaction conditions. Of course, where nitrogen derivatives of the phthalocyanine forming materials are used such as the imides, the amides, and the imimides, which already contain a portion of the nitrogen necessary for formation of the phthalocyanine molecule, smaller quantities of the nitrogen donor may be employed.

The reaction to produce the phthalocyanine materials of the present invention may be carried out in a vessel open to the atmosphere or in a vessel closed to develop autogenous pressure. The reaction vessel should be lined with a material which will not poison the reaction nor introduce amounts of deleterious materials to dirty the color of the pigment produced. Hence, the vessel should preferably be glass lined. The reaction vessel should also be fitted with an agitator and a reflux column if open to the air and a vent for the noncondensables.

The reactants may be added to the reaction vessel, singly or together, in any order; when solid, they are preferably first pulverized to insure a high rate of reaction. After introduction into the reaction vessel, the mixture is heated slowly at a constant rate, usually about 1–3° C. per minute, to the reaction temperature ranging from 150 to 250° C., preferably from about 175 to 185° C. to afford the best reaction rate and yield of pigment displaying satisfactory pigmental strength and brilliance. The slow heat-up period is desired to avoid initial excessive frothing. The time of heating at the reaction temperature will vary somewhat depending on the volume of the reaction mixture, the temperature, degree of agitation, and the like. Therefore, the time of heating is chosen to obtain the highest yield of the pigment. Extended reaction periods are uneconomical. Heating at the reaction temperature for more than about 3 hours fails to increase appreciably the yield of pigment. For a temperature range of about 175–185° C., the reaction time will vary from 1–3 hours. The mixture is constantly agitated during both the warm-up and the reaction periods.

At the end of the reaction period, the phthalocyanine pigment can be filtered hot or cold, and the filter cake obtained is leached with one or more solvents such as trichlorobenzene, benzene and ethanol to remove the original solvent and other materials soluble in the organic solvent. Instead of using benzene and ethanol, the trichlorobenzene remaining after washing can be removed by vacuum drying. After this solvent treatment or drying step, the filter cake is broken up and suspended in a weak solution of sulfuric acid which may be warmed, filtered, and washed with water until the filtrate is about neutral. The filter cake is next treated with a dilute solution of caustic, filtered, washed until the filtrate again is about neutral and may be dried. The procedure of treating the phthalocyanine pigment filter cake first with dilute acid and then with dilute caustic is preferred since it was observed that when the order of treatment was reversed, the caustic precipitated metallic hydroxides and oxides as dark protective films over small amounts of unreacted phthalocyanine forming material, nitrogen donor compounds or polymers and other substances. Further, the caustic liberated gaseous ammonia that induced troublesome frothing. Subsequent treatment with dilute acid removed the protective films from the suspended solids whereupon the nitrogen donor compounds or polymers dissolved. However, unreacted phthalocyanine forming material remained to dilute the resulting pigment. Moreover, acid pasting did not remove the unreacted phthalocyanine forming material which diluted the finished color. In contrast, the preferred order of refining the pigment eliminated the troublesome frothing caused by ammonia evolution during the caustic treatment and prevented unreacted phthalocyanine forming material from getting into the finished color. Any residual metal oxide remaining after the acid and caustic treatment steps may be removed by treating the pigment with strong (50%) $H_2SO_4$, filtering and washing until the filtrate is neutral.

During the reaction and during the refining steps, the by-products and unreacted starting materials, etc., obtained may be discharged to the atmosphere, to waste or to storage for refining and further use if desired.

The refined color can then be conditioned or finished by any one of a number of methods to prepare it for use. One procedure involves solution of the pigment, if soluble in acid, in about 10 parts of very strong sulfuric acid followed by pouring into sufficient crushed ice to give a final slurry containing about 15% acid. The pigment is separated from the slurry and the resulting pigment paste is washed and then either laked or dried as desired. Additionally or alternatively, the pigment may be ball milled in the presence of an organic diluent to obtain the desired particle size. Ball milling is especially useful in reducing the particle size of those pigments neither soluble in concentrated sulfuric acid nor responsive to acid pasting. After finishing, the pigment may then be treated with various oils, resins, etc., and incorporated with the usual compounding ingredients in paints, enamels, lacquers, plastics, such as rigid or plasticized polyvinyl chloride or copolymerized vinyl chloride-vinylidene chloride materials, rubbers, and the like, to color the same.

The following examples will serve to illustrate the invention with more particularity to those skilled in the art:

Example 1

Titanium tetrachloride was hydrolyzed by adding it dropwise to a fortyfold volume of distilled water at room temperature to produce a strongly acidic translucent sol. Ammonium hydroxide solution (6 N) was then added slowly to the sol, to a pH of 8 to 9 as determined on hydrion test paper (Micro Essential Lab., Brooklyn 10, N. Y.), to precipitate the titanium dioxide as a white gel. The gel is believed to have the formula $TiO_2.XH_2O$ or $Ti(OH)_xO_{2-x/2}$ where $x$ is an integer of from 1 to 4. The slurry was filtered by gravity through muslin to collect the gel which was stirred vigorously with a large volume of water and decanted to wash the gel and remove the chloride ions. The wash water, tap or distilled, contained a minor amount of dilute nitric acid (0.8 ml. of 6 N acid per milliliter of $TiCl_4$) and of dilute ammonium hydroxide (1.0 ml. of 6 N base per milliliter of $TiCl_4$) as electrolytes, added in the order named, to keep the gel from peptizing and to maintain the gel structure. The gel washing step was repeated from 5 to 7 times until all of the chloride ions had been removed. Washing was considered complete when an acidified sample of the filtrate did not give a precipitate with standard silver nitrate reagent. Thereafter, the gel was given a final wash on the filter by pouring distilled water over it to displace most of the mechanically held solution containing traces of ammonium nitrate. Allowing the gel to drain overnight in a covered filter removed some of the water without drying the gel. The freshly prepared hydrated titanium dioxide gel assaying 4.7% $TiO_2$ and 95.3% water, was then added to the reaction vessel. The charge, including the catalyst, in the reaction vessel comprised the following ingredients in the proportions shown below:

| Components | Grams | Mols | Mol Ratio |
|---|---|---|---|
| Trichlorobenzene | 865 | 4.5 | 22.5 |
| Tetrachlorophthalic anhydride | 57.2 | .20 | 1.0 |
| Urea | 80 | 1.33 | 6.67 |
| Cupric ions (from 13.5 grams of $Cu(NO_3)_2 \cdot 3H_2O$) | | .056 | .28 |
| Titanium ions (from 3.7 g. of $TiO_2$ as the freshly prepared hydrated gel) | | .0466 | .233 |

The mixture was then heated from room temperature to a temperature of about 175° C. at a rate of temperature rise of about 1.75° C. per minute with agitation. Heating of the mixture while agitated was then continued for 2½ hours during which time the temperature rose to 185° C. The reaction is believed to progress as follows:

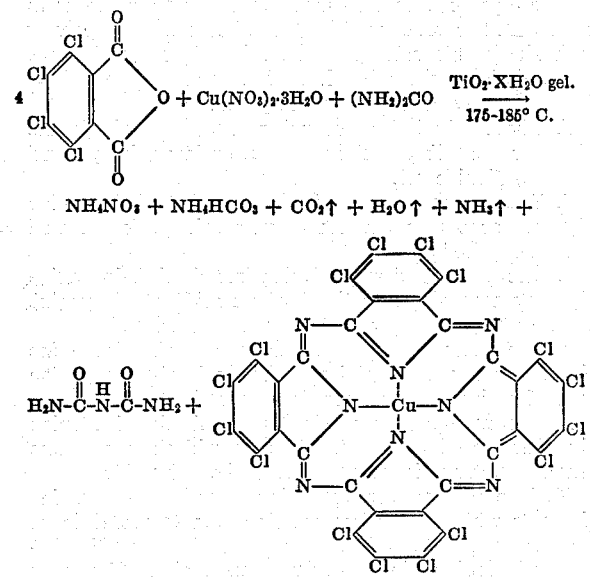

At the end of the reaction period, the heater was removed to allow the batch to cool naturally. The temperature fell rapidly (about 2° C. per minute); and when it had fallen below 140° C., the pigment was filtered off on a suction filter. Rinsings of the reaction vessel, agitator, thermometer and lid with trichlorobenzene were added to the filter. Small portions of fresh trichlorobenzene were then poured over the filter cake to displace the saturated trichlorobenzene. Two rinsings of the filter cake with benzene displaced the trichlorobenzene and two rinsings with ethanol displaced the benzene. The crude ethanol-wet cake was mashed into small lumps (¼" to ½") and added under moderate stirring to dilute sulfuric acid (2 liters of 2% acid in a 4 liter beaker) at about 50° C. The slurry was warmed to 85° C. as promptly as possible (about 1 hour on an electric hotplate) and kept at 85–95° C. for 2 hours, adding make-up water from time to time. The temperature was kept at 95° C. or below to avoid stabilization of gas bubbles, due to gas-vapor-steam evolution, by the pigment particles and to forestall a rapid increase in volume and a consequent overflow. At the end of the period, the mixture was filtered by suction. Washing of the cake with hot tap water was continued until the filtrate tested to a pH of 5–7. Next, the filter cake was mashed as before and added to dilute sodium hydroxide solution (2 liters of 2% base in a 4 liter beaker) using the same temperature and time limits set forth above with respect to the acid treatment step. Washing of the caustic treated filter cake was complete when the final rinsing filtrate tested to a pH of 7–8. The washed filter cake was then dried and weighed. The yield of pigment was about 89.2% of the theoretical yield. In a series of duplicate reactions, hydrated gel that had been dried for 16 hours at 95° C. produced a negligible amount of green pigment; but gel that had been dried as above and then rehydrated by boiling with distilled water gave a 20% yield of pigment. Commercial titanium dioxide, before or after treatment with boiling water, failed to develop even a trace of green pigment in the reaction. Apparently, the crystalline forms of titanium dioxide and the hydroxide or hydrated $TiO_2$ do not have the proper activity, as exhibited by the gel, for converting tetrachlorophthalic anhydride to phthalo green.

*Example II*

The method of this example was the same as that of Example I, above, except that the catalyst, the hydrated titanium dioxide gel, was not washed to remove the chloride ions which were present throughout the reaction as $NH_4Cl$. The yield of pigment was 60%. This example illustrates the desirability of eliminating all, or essentially all, of the chloride ions from the gel in order to obtain a high degree of conversion.

*Example III*

The method of this example was the same as Example I, above, except that the catalyst, the chloride-ion free hydrated titanium dioxide gel, was treated by several methods before utilization in the phthalocyanine reaction. The method of treatment and the yields obtained are shown below:

| Treatment of Gel | Percent Conversion |
|---|---|
| (a) Aged for 7 days in contact with distilled water | 64.5 |
| (b) Dried on filter paper at 25° C. for 48 hours, finely ground and stored in trichlorobenzene for 6 days | 50 |
| (c) Same as (b), above, but the temperature was 55° C. and the storage time was 7 days | 44.7 |
| (d) Same as (b), above, but the temperature was 70° C. | 28 |
| (e) Used at once after drying at 95° C. for 16 hours | 10 |

The above data show that aging and/or drying of the gel will not produce the high yields obtained as compared to using the freshly prepared undried or unheated gel.

*Example IV*

The method of this example was the same as that shown for Example I, above, except that freshly prepared hydrated anion-free zirconium dioxide gel, prepared from zirconium tetrachloride in the same manner as set forth in Example I, was used in place of the titanium dioxide gel catalyst. The yield of pigment obtained was about 88.6% of the theoretical. This example illustrates the fact that other metal gels besides titanium will form useful catalysts for the phthalocyanine reaction.

*Example V*

The method of this example was the same as that of Example I, above, except that cupric chloride ($CuCl_2$) was used in place of $Cu(NO_3)_2 \cdot 3H_2O$ as a source of copper ions. The catalyst was freshly prepared anion-free hydrated titanium dioxide gel. The conversion of tetrachlorophthalic anhydride to copper hexadecachlorophthalocyanine was about 87.5%. This example discloses that other metal donor reagents besides copper nitrate can be used in the reaction.

In summary, the present invention teaches that high yields of phthalocyanine pigments can be obtained by using a hydrated metallic oxide gel in the phthalocyanine reaction. The percent conversion obtained is much higher than when the pure oxide or hydroxide of the metal is used. Moreover, it has been shown that the gel must be anion-free and freshly prepared if best results are to be obtained. Preferably, the freshly prepared anion-free hydrated titanium and zirconium dioxide gels are employed for highest yields. The high catalytic activity and noncorrosiveness of the catalytic gels herein disclosed makes them especially useful in the phthalocyanine reaction. It, thus, is apparent that by the use of the method of the present invention economies can be realized in the phthalocyanine synthesis as a result of the high conversions obtained.

What is claimed is:

1. The method producing metal phthalocyanine pigments which comprises heating in the presence of an inert organic high boiling point solvent a phthalocyanine forming metal donor reagent selected from the group consisting of copper, nickel, iron, cobalt, vanadium, tin, chromium, lead, aluminum, cadmium, magnesium and zinc and their salts, a phthalocyanine forming material selected from the group consisting of phthalic acid, phthalic anhydride, the methyl and ethyl esters of phthalic acid and phthalic anhydride and their mono-, di-, tri- and tetrabromo and -chloro and alkoxy derivatives and mixtures thereof, a phthalocyanine nitrogen donor selected from the group consisting of urea, biuret, guanidine, guanylurea, dicyandiamide and cyanuric acid and at least a minor molar amount computed as metallic ions and as compared to the other reactants present and sufficient to catalyze the phthalocyanine reaction to form said pigment of at least one fresly prepared essentially anion-free hydrated oxide gel of an element selected from the group consisting of titanium and zirconium and mixtures thereof to a temperature and for a time sufficient to form a phthalocyanine pigment.

2. The method of producing metal phthalocyanine pigments which comprises heating with agitation in the presence of an inert organic high boiling point solvent a phthalocyanine forming metal donor reagent selected from the group consisting of copper, nickel, iron, cobalt, vanadium, tin, chromium, lead, aluminum, cadmium, magnesium and zinc and their salts, a phthalocyanine forming material selected from the group consisting of phthalic acid, phthalic anhydride, the methyl and ethyl esters of phthalic acid and phthalic anhydride and their mono-, di-, tri- and tetrabromo and -chloro and alkoxy derivatives and mixtures thereof, a phthalocyanine nitrogen donor selected from the group consisting of urea, biuret, guanidine, guanylurea, dicyandiamide and cyanuric acid and at least a minor molar amount computed as metallic ions and as compared to the other reactants present and sufficient to catalyze the phthalocyanine reaction to form said pigment of at least one freshly prepared essentially anion-free hydrated oxide gel of an element selected from the group consisting of titanium and zirconium and mixtures thereof to a temperature of from 150 to 250° C. and for a period of time sufficient to form a phthalocyanine pigment.

3. The method for producing metal phthalocyanine pigments which comprises mixing together an inert organic high boiling point solvent, a phthalocyanine forming metal donor reagent selected from the group consisting of copper, nickel, iron, cobalt, vanadium, tin, chromium, lead, aluminum, cadmium, magnesium and zinc and their salts, a phthalocyanine forming material selected from the group consisting of phthalic acid, phthalic anhydride, the methyl and ethyl esters of phthalic acid and phthalic anhydride and their mono-, di-, tri- and tetrabromo and -chloro and alkoxy derivatives and mixtures thereof, a phthalocyanine nitrogen donor selected from the group consisting of urea, biuret, guanidine, guanylurea, dicyandiamide and cyanuric acid and at least a minor molar amount computed as metallic ions and as compared to the other reactants present and sufficient to catalyze the phthalocyanine reaction to form said pigment of at least one freshly prepared essentially anion-free hydrated oxide gel of an element selected from the group consisting of titanium and zirconium and mixtures thereof to form a mixture, slowly heating said mixture while agitating the same to a temperature of from about 175 to 185° C., heating and agitating said mixture at said temperature for from 1 to 3 hours to form said pigment and separating the pigment produced from the reaction mixture.

4. The method for producing metal phthalocyanine pigments according to claim 2 containing the additional steps of filtering the phthalocyanine pigment reaction mass to obtain a filter cake, washing the filter cake successively with an organic solvent, dilute mineral acid and dilute inorganic base, and removing said solvent, acid and base from said cake after each washing step.

5. The method for producing metal phthalocyanine pigments according to claim 4 where said gel is hydrated titanium dioxide gel.

6. The method for producing metal phthalocyanine pigments according to claim 4 where said gel is hydrated zirconium dioxide gel.

7. The method for producing metal phthalocyanine pigments according to claim 4 where said phthalocyanine metal forming donor reagent is copper chloride.

8. The method for producing metal phthalocyanine pigments according to claim 4 where said phthalocyanine metal forming donor reagent is copper nitrate.

9. The method for producing metal phthalocyanine pigments according to claim 4 where said phthalocyanine forming material is tetrachlorophthalic anhydride.

10. The method for producing metal phthalocyanine pigments which comprises reacting at a temperature of from about 175 to 185° C. for about 2½ hours the following ingredients in the ratios named: about 22.5 mols of trichlorobenzene, about 1 mol of tetrachlorophthalic anhydride, about 6.7 mols of urea, about 0.3 mol of cupric ions as cupric nitrate trihydrate and about 0.23 mol of titanium ions as freshly prepared anion-free hydrated titanium dioxide gel.

References Cited in the file of this patent

UNITED STATES PATENTS

| | | |
|---|---|---|
| 2,276,598 | Stocker et al. | Mar. 17, 1942 |
| 2,410,301 | O'Neal | Oct. 29, 1946 |
| 2,549,842 | Moser | Apr. 24, 1951 |
| 2,662,896 | Pedersen | Dec. 15, 1953 |
| 2,727,043 | Rosch et al. | Dec. 13, 1955 |